Jan. 13, 1931. A. L. GREENABAUM Re. 17,932

ROAD SPREADER OR PLOW

Original Filed April 25, 1921 4 Sheets-Sheet 1

Inventor
Alexander L. Greenabaum
By
Arthur W. Nelson
Attorney

Jan. 13, 1931. A. L. GREENABAUM Re. 17,932

ROAD SPREADER OR PLOW

Original Filed April 25, 1921 4 Sheets-Sheet 2

Inventor
Alexander L. Greenabaum
By Arthur W. Nelson
Attorney

Jan. 13, 1931. A. L. GREENABAUM Re. 17,932

ROAD SPREADER OR PLOW

Original Filed April 25, 1921 4 Sheets-Sheet 3

Inventor
Alexander L. Greenabaum
By Arthur W. Nelson
Attorney

Jan. 13, 1931. A. L. GREENABAUM Re. 17,932
ROAD SPREADER OR PLOW
Original Filed April 25, 1921 4 Sheets-Sheet 4
Fig. 6.
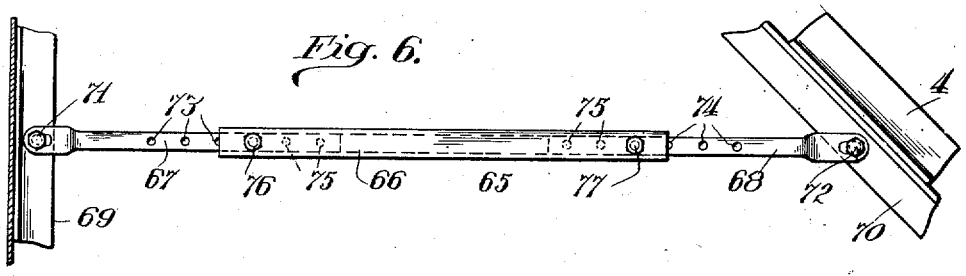
Fig. 7.
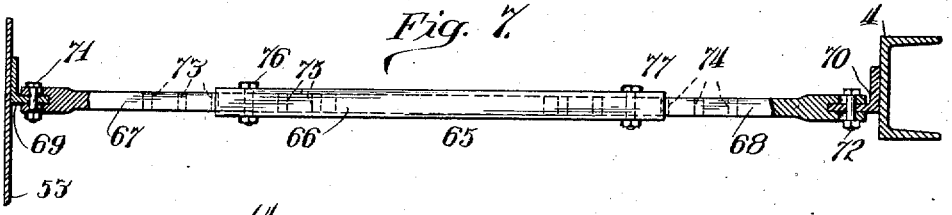
Fig. 8.
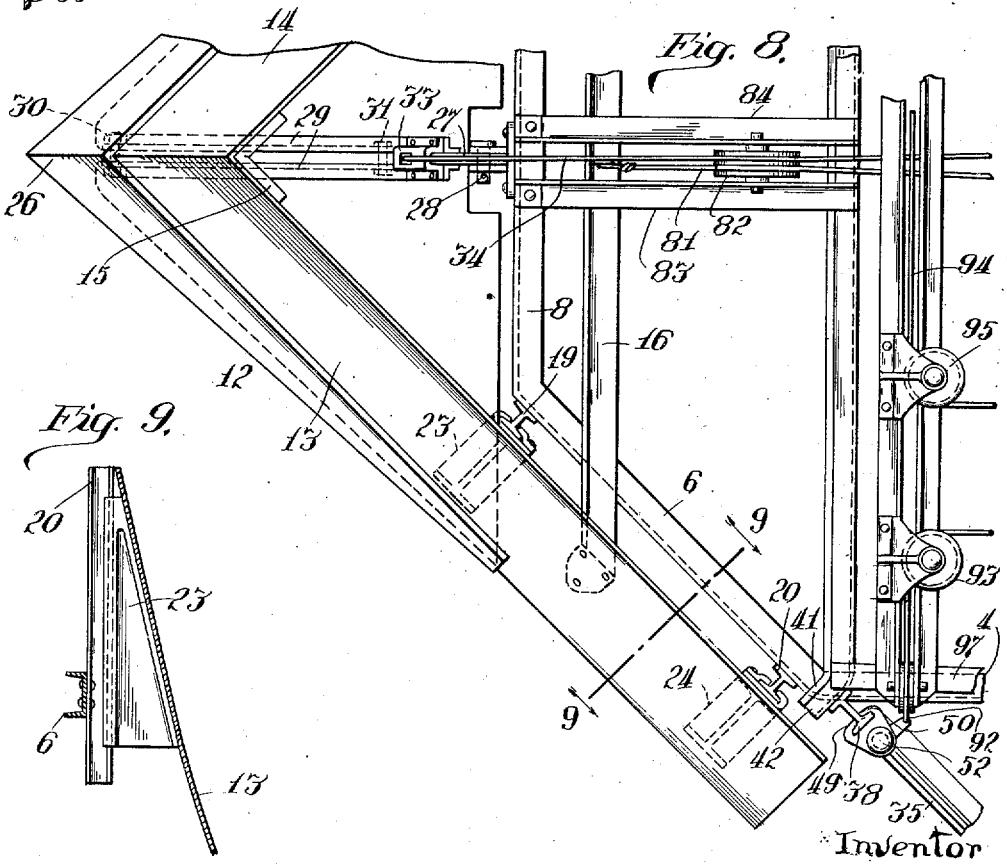
Fig. 9.
Inventor
Alexander L. Greenabaum
By
Arthur W. Nelson
Attorney Reissued Jan. 13, 1931

Re. 17,932

UNITED STATES PATENT OFFICE

ALEXANDER L. GREENABAUM, OF CHICAGO, ILLINOIS, ASSIGNOR TO O. F. JORDAN COMPANY, OF EAST CHICAGO, INDIANA

ROAD SPREADER OR PLOW

Original No. 1,561,604, dated November 17, 1925, Serial No. 464,126, filed April 25, 1921. Application for reissue filed April 28, 1926. Serial No. 105,302.

My invention relates generally to improvements in spreaders or plows but relates more particularly to improvements in spreaders or plows for use in conjunction with road vehicles; and has for its object the distribution, spreading and shaping of any material that may be upon the roadway and the movement of which it is desired to effect. In the making of roads or in the maintenance thereof it is often desirable to be able to level or spread material previously deposited upon the road to the end that a desired level or grade of the road may be secured. Also in making new roadways it is often necessary to remove material that is above the desired grade at one side of the roadway to the opposite side or some intermediate point where the roadway may be below the desired grade or level. In the course of making a new roadway considerable difficulty has heretofore been encountered in maintaining the desired grade. That is to say, assuming that the course of the proposed road undulates, i. e. is rough and irregular, it is necessary to remove varying amounts of material. Because of this fact and also because of the fact that in machines heretofore devised for this purpose the material moving means found its support intermediate the ground contacting wheels or tractive elements of the vehicle, the course of movement of the material moving means did not proceed along any fixed grade or plane, but usually followed some mean line between the forward and rearward supporting elements, thus requiring several operations in order to remove accurately to grade.

In road maintenance work it is also imperative that means shall be at hand whereby it shall be possible to remove snow and slush from the road. This is especially so in the more congested parts of the country and in the cities, in which latter place, it has heretofore been necessary to remove the snow very quickly after its fall. Otherwise heavy traffic soon compacts the snow to such an extent as to baffle removal except by such slow and laborious a method as with pickaxe and shovel.

While it is necessary that those in charge of highway maintenance shall be prepared for the removal of snow it may be that weather conditions are such that little, if any, snow falls, thus necessitating use but a few times during the year and during some winters not at all. As a result it has heretofore been necessary to make a heavy investment in machines the use of which was required only at very infrequent periods.

The general object of my invention is to provide an all around road spreader or plow, i. e. a device which shall function effectively in the moving, spreading and distributing of such materials, as stone, gravel, dirt, snow, slush, ice and the like.

It is a further object of my invention to provide a plow and spreader which shall be capable of shifting or conveying material from a considerable distance on one side of the road to a considerable distance upon the other with the resultant ability to shift material and level a considerable expanse of roadway in one operation while in use as a road building device, and with the ability to clear practically an entire roadway of snow in a single movement or passage thereover when used for snow removal purposes.

I aim also to provide a device of the character mentioned which shall be capable of easy attachment to and removal from the road vehicle or device which is to propel the same, or to which it is to be attached.

A further object of my invention is to provide a device of the character mentioned which shall be of such construction as to be easily operated; which shall be composed of relatively few parts; and which shall be so formed and constructed as easily to withstand the forces to which it is subjected in use and hence which will be of durable character.

My invention consists generally in apparatus of the form, arrangement, construction, and co-operation of the parts whereby the above named objects, together with others that will appear hereinafter, are attainable; and my invention will be more readily understood by reference to the accompanying drawings which illustrate what I consider, at the present time, to be the preferred embodiment thereof.

In said drawings:

Fig. 6 is a fragmentary plan view showing another of the braces used in bracing the spreader wing.

Fig. 7 is a view, partly in section, and, partly, in elevation, of the strut or brace shown in Fig. 6 and the parts to which it is connected.

Fig. 8 is a fragmentary plan view of the front or plow part of the apparatus, the same being upon a scale enlarged with respect to the scale of Fig. 1; and Fig. 9 is a detail sectional view substantially along the line 9—9 of Fig. 8.

Figure 1:
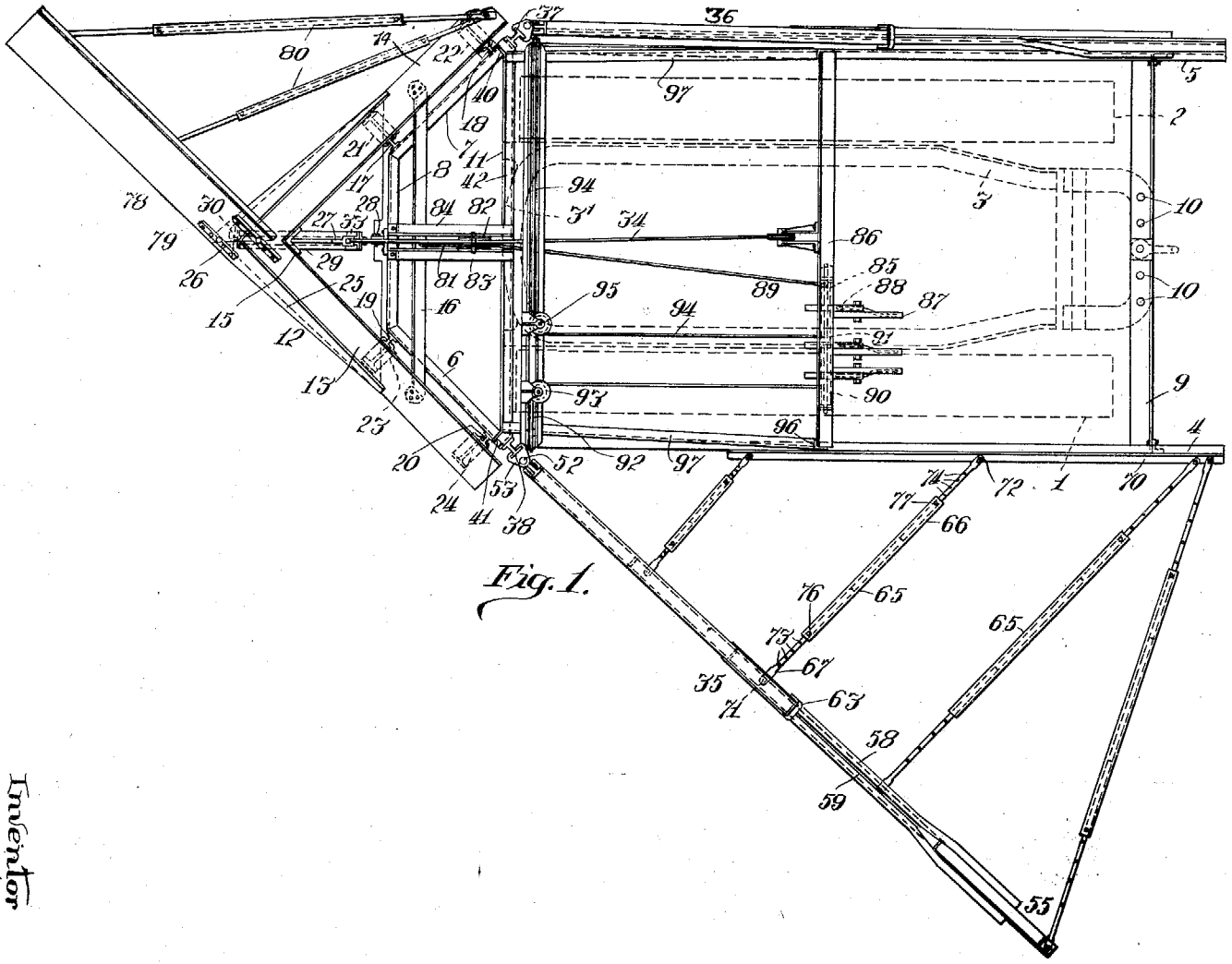
Fig. 1 is a plan view of a device embodying my invention.
Figure 2:
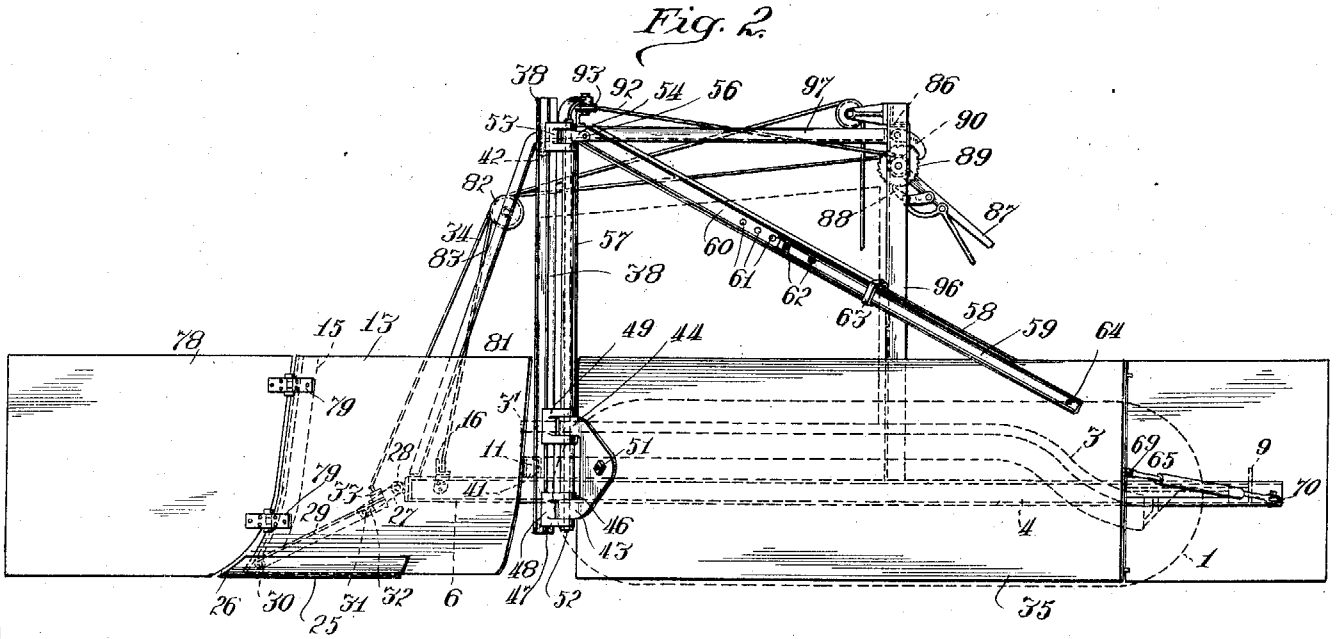
Fig. 2 is a side elevation thereof.
Figure 3:
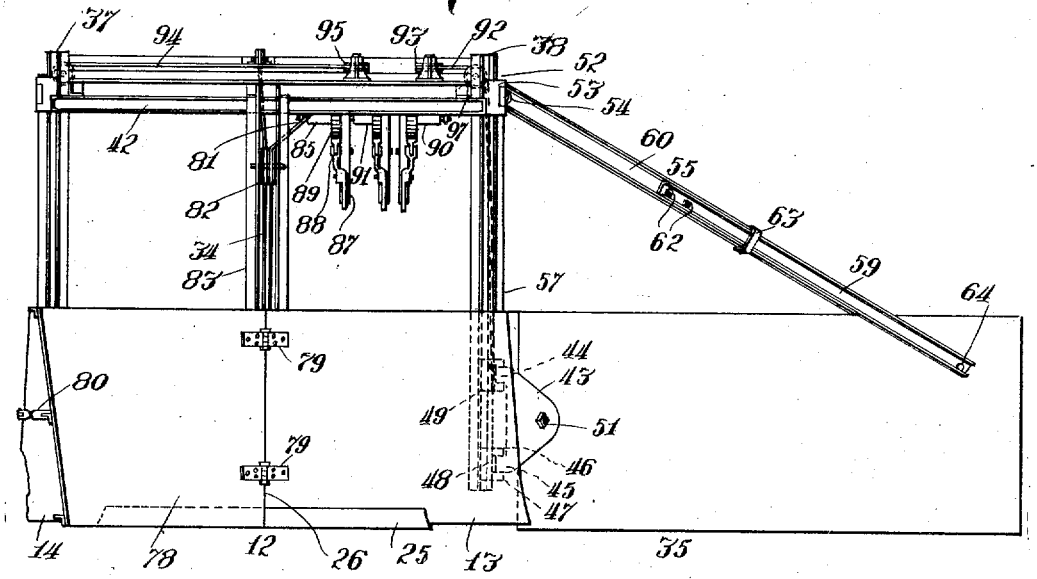
Fig. 3 is a front elevation of the device.
Figure 4:
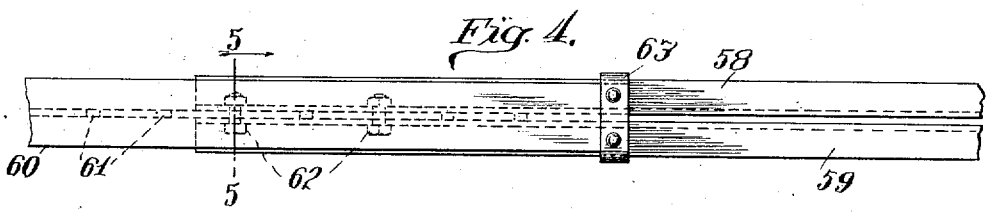
Fig. 4 is a fragmentary view of one of the struts used in bracing the spreader wing.
Figure 5:
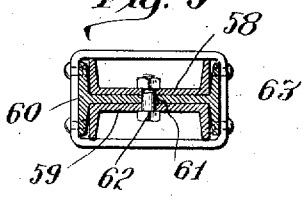
Fig. 5 is a sectional view, upon an enlarged scale, viewed along the line 5—5 of Fig. 4.

In the drawings my apparatus is illustrated in conjunction with a tractor of the endless tread type (shown by means of dotted lines) but this, it should be understood, is by way of illustration, and not by way of limitation, except where limitations to this end are embodied in the appended claims. I wish it to be understood, however, that my apparatus, in many respects, functions better when attached to a tractor having elongated endless tractor elements. For instance, in the moving or displacing of heavy materials, or large amounts of materials, or materials that are heavily compacted or compressed, the large tractive surface of the endless tractive elements and the great tractive effort which is thereby attainable, enables the removal and displacement of materials in amounts and in character which would otherwise completely baffle displacement. So, also, in the making of a roadway the endless tractor elements are of especial value inasmuch as they serve as a support rearward of the plow and hence upon the previously smoothed or leveled part of the roadway. Because of the extended character of the support it is also possible to cut or remove large amounts of material without causing the plow to dig itself downwardly below the grade or level which it is desired to maintain. Thus, it becames apparent that my apparatus is of especial value when used in conjunction with a tractor of the endless tread type and for this reason I have designed the apparatus here shown so that it may be very easily as well as very quickly attached to a machine of that type.

Referring now to the drawings for the details of construction 1 and 2 represent the endless tractor elements and 3 the frame of the tractor, all being indicated by means of dotted lines better to display the construction and operation of my novel mechanism which is designed for attachment thereto. As here shown, my apparatus likewise is built upon or around a frame. The frame, in this instance, is composed of the parallel side members 4 and 5, respectively, which assume the form of channel members and which at their forward ends are bent inwardly at an angle to form the portions 6 and 7, respectively. The frame portions 6 and 7 are rigidly connected by the transverse channel member 8 and the rear ends of the side channels 4 and 5 are cross-connected by means of an angle member 9 which, in turn, is bolted or otherwise rigidly secured to the frame 3 of the tractor as by means of bolts 10.

The frame is also cross-connected near the front end by means of the channel member 11 which is pressed or humped upwardly in the middle so that it may pass on the upper side of the front portion 3′ of the tractor frame. In fact, it rests upon the tractor frame, being suitably secured thereto by means of bolts. Thus, it will be observed that the frame of my apparatus encompasses the tractor and that it is supported therefrom by the transverse brace members which serve rigidly to hold the frame of my apparatus in place. In order that there may be no confusion, I shall hereinafter refer to the frame of my aparatus as the plow spreader frame.

At the forward end of the plow spreader frame I mount a V-shaped plow 12 which, as here shown, is composed of the generally upstanding but slightly rearwardly inclined plate members 13 and 14. These plates are braced at the nose by means of the angle member 15 and rearwardly are cross-connected by means of the beam 16. This beam 16 serves a dual purpose, to wit, that of bracing the plates 13 and 14 of the plow and also of supporting the plow in its lowermost working position. This is accomplished by mounting the beam 16 at such height that when the plow 12 is in its lowermost working position the beam 16 will rest upon the upper faces of the portions 6 and 7 of the plow spreader frame. For various purposes and for different reasons it is necessary or at least desirable that the plow shall be vertically movable and, at the same time, due to the enormous forces encountered in action, it must be very rigidly and substantially mounted. In order to enable the vertical movement of the plow, i. e. the raising and lowering thereof I have mounted, on the plow spreader frame, vertically positioned I-beams 17, 18, 19 and 20 and upon the inner faces of the plow I have provided ways 21, 22, 23, and 24, respectively, the construction of which is probably best shown in Figs. 8 and 9 and wherein it will be seen that the ways straddle the I-beams and that they are blocked from the inclined plates of the plow so as to occupy a vertical position. The mechanism by which the plow is raised and lowered will be described later.

There is a great tendency on the part of the plow, especially when displacing heavily packed material to dig itself in; that is to say to swing below the plane of the desired grade. Such action is prevented, however, by the spaced I-beams and interacting ways and also by means of the cross-beam 16, which rests upon the plow spreader frame. Therefore, the plow cannot swing downwardly without tilting the entire tractor, plow spreader frame and other parts, which usually weigh several tons. I prefer, however, to counteract this tendency of the plow to dig itself in in still another way and to this end, I have provided what I term a supporting plate and which bears the reference character 25. This supporting plate is preferably a casting and is formed with an upstanding or nose portion 26 which serves to take the wear from the plates of the plow, inasmuch as this nose portion is first to engage and displace the material.

While at times there may be a tendency of the plow to swing below the normal plane, provision must also be made to prevent an obstruction, or other element, from lifting the plow. To this end, I have provided a toggle bracing construction extending between the front member 8 of the plow spreader frame and the front lower portion of the plow. It comprises the relatively short toggle lever member 27, which is pivotally secured to the plow spreader frame at 28, and the relatively long toggle member 29 which is pivotally secured to the supporting plate of the plow at 30. The toggle levers 27 and 29 are interconnected by means of a pin 31, and the toggle member 29 is provided with an elongated slot 32 to permit swinging movement of the parts to either side of a line drawn between the pivotal connections 28 and 30 respectively. In normal operation the toggle members 27 and 29 are swung so that their center lines are below a line extending between the pivots 28 and 30. Thus any tendency of the plow to move upwardly tends to further depress the toggle members, but further depression is positively prevented by means of the strap 33 which connects the two spaced parts of which the member 29 is formed, and which passes on the upper side of the toggle member 29. Before the plow can move upwardly it is necessary to "break" the toggle and this is accomplished by means of a cable 34 which is attached to the strap 33 at one end and which passes over suitable sheaves, as shown, to a position convenient for manipulation by the operator.

At each side of the plow spreader frame I have provided what I term spreader wings and which as a whole bear the reference characters 35 and 36, respectively. I have provided means whereby these spreader wings may be raised and lowered as a whole; whereby they may be swung in a horizontal plane to and from the plow spreader frame; and I have provided means whereby they may be swung in a vertical plane. The construction and operation of the spreader wings 35 and 36 are alike and hence a description of one, and its operation, will serve for both.

Mounted adjacent the forward end of the plow spreader frame will be found two vertically disposed I-beams 37 and 38, respectively. These I-beams extend somewhat below the plow spreader frame and also extend to a very considerable distance thereabove. These I-beams are secured near their lower ends to portions 40 and 41 of the cross frame member 11, which portions are bent so as to occupy positions substantially at right angles to the portions 6 and 7 of the plow spreader frame. Thus when I-beams are mounted upon these portions they extend in the same general direction (cross-sectionally considered) as the direction of the portions 6 and 7 which, in turn, substantially parallel the plate portions of the V-shaped plow 12. Near their upper ends the I-beams 37 and 38 are secured to a transversely extending channel member 42 which corresponds in shape and form to the channel member 11, except that it is usually of smaller size as it is not subjected to the severe strains imposed upon the member 11 constituting part of the plow spreader frame proper. It will be understood that the I-beams 37 and 38 are permanently and rigidly secured to these transversely disposed members and that they are thus held rigidly, vertically, and immovably.

Now referring to the wing 35 as an illustration of both wings, it will be observed that at its inner end it is provided with a heavy plate member 43 which is provided with spaced lug portions 44 and 45, respectively which portions enter the pairs of spaced lug portions 46 and 47, respectively of the member 48. The member 48 also has portions 49 and 50, respectively, which embrace the I-beam, relatively loosely, so as to permit sliding movement on the I-beams. 51 is a horizontal pivot passing through the plate 43 and wing 35, and 52 is a vertical pivot connecting the plate 43 with the member 48 that is slidably mounted upon the I-beam 38. The pivot pin 52 extends upwardly a considerable distance and at its upper end serves to unite the member 53 that is slidably mounted upon the I-beam 38, and the member 54 that is secured to the bracing strut 55 by means of the horizontal pivot pin 56. 57 is a sleeve which properly spaces the member 53 from the member 48.

The strut 55 is composed, as here shown, of the two channel members 58 and 59 which are spaced apart a distance sufficient to accommodate the web of the I-beam portion or member 60. The I-beam 60 is provided with a plurality of holes 61 through any of which bolts 62 may pass, thus admitting of the shortening or lengthening of the strut 55 as may be necessary or desirable to position the spreader wing 35 at the desired angle. A strap 63 secured to the I-beam 60, encompasses the channel members 58 and 59 and serves to take most of the strain off the securing bolts 62. The channel members 58 and 59, at their lower ends, straddle the spreader wing 35 and are secured thereto by means of the horizontal pivot 64. Thus the spreader wing 35 is mounted for vertical movement as a whole upwardly or downwardly, sliding on the vertical I-beam. It may likewise, as before described, be swung upon the horizontal pivot 51 to position its lower edge at any desired angle to the horizontal, being held very firmly and securely in any of its placed positions by means of the diagonal strut or wing pressing member 55. It will be understood, also, that the spreader wing 35 may be swung to and from the side of the apparatus swinging upon the vertical pivot 52. For bracing and holding the spreader wing in desired angular position relative to the side of the plow spreader frame I have provided a plurality of adjustable braces 65, which are of different lengths, but are otherwise similar in construction. Therefore, a description of one will suffice for all. As is probably best shown in Figs. 6 and 7, the brace 65 is composed of a central hollow tubular member 66 into which extend the solid end members 67 and 68. The members 67 and 68, at their outer ends, are bifurcated and straddle respectively the angle member 69 secured to the inner side of the spreader wing 35, and the angle member 70 which is secured to the plow spreader frame, being secured to the said parts by means of the bolts 71 and 72 respectively. The tubular member 66 is sufficiently large to admit the members 67 and 68 freely so that telescoping of the parts may take place in order to change the effective length of the brace 65. For holding the parts in any set position I provide the members 67 and 68 with a plurality of vertical holes 73 and 74, respectively and provide the tubular member 66 with correspondingly sized holes 75. By aligning these holes and fastening bolts 76 and 77 therethrough the parts are locked in any set position. If it is desired to swing the spreader wing 35 into substantially parallel relation to the plow spreader frame the braces 65 may be very quickly and easily removed.

At times it may be desirable to shift or move material from a point beyond the center of the apparatus to a point considerably to one side thereof and for this purpose I have provided what I term a front wing and which bears the reference character 78. This front wing is hingedly secured to the plow 12 along the nose portion thereof as by means of the hinge members 79 and it is suitably braced as by means of the telescopic bracing members 80 which are, or may be, similar to the braces 65, heretofore described.

I have already described the construction which permits raising and lowering of the front plow and the spreader wings, and I shall now describe the means by which they may be raised and lowered.

Considering first the front plow it will be observed that I provide a cable 81 which is attached at one end to the crossbeam 16 of the plow which passes over a sheave, 82, that is carried in the upwardly inclined angle members 83 and 84 that extend between the channel member 8 and the channel member 42 of the frame work, and from thence to the drum 85, which is rotatably suspended from the cross-member 86 of the frame. The drum 85 may be actuated by means of the hand lever 87 which carries the pawl 88 for engagement with the ratchet portion 89 of the drum. By this means a very powerful pull can be exerted upon the cable 81 serving to lift the plow. As before stated, however, before the plow can be raised it is necessary to "break" the toggle brace, as before described. Of course, reversal of the drum 85 permits the plow to move downwardly which it will do of its own weight.

The spreader wings 35 and 36 may be raised by means of similar drums 90 and 91 which are actuated by ratchet levers of the construction already described. The cable 92 has one end attached to the hinged portion 54 of the mounting means for the spreader wing 35, passes over the horizontally disposed sheave 93, and thence to the drum 90. A cable 94 similarly passes another sheave 95 and thence to the other side of the apparatus where it is connected, in the same manner, to the means supporting the wing 36 and likewise has one end secured to the drum 91. The various drums 85, 90 and 91 are arranged in close proximity, one to the other, so that they may all be manipulated, conveniently, from one position on the vehicle.

I omitted to state that the cross member 86 is supported by the standards 96 which upstand from the plow spreader frame member and also by means of the braces 97 that extend rearwardly from the upper cross channel member 42.

It will be understood that the apparatus may be used either with or without the front spreader wing. Also that the spreader wing may be reversed so as to extend in the position opposite from that shown in full lines in the drawing, the full line position being a position in which it is placed when it cooperates with the wing 35. So also it should be understood that the spreader wings may both be used at the same time in conjunction with the front plow, or one thereof may be used in conjunction with the front plow, or both of the wings may be swung to inoperative position at the side of the plow spreader frame and the plow alone employed.

Again, if desired, the plow and the front wing may be used together. From the foregoing it will be observed that the objects set forth in the opening of the specification are fully and completely attainable by means of the apparatus herein shown and described and it will be understood that my apparatus is capable of use for a wide variety of purposes for all of which it serves in an admirable manner.

By removing the rear cross brace 9, and removing the bolts that secure the front brace 11 to the frame of the tractor my apparatus can be bodily removed from the tractor. Of course the attachment of my apparatus to the tractor is effected by a mere reversal of the steps described.

Inasmuch as this disclosure will suggest to others skilled in the art to which this appertains modified constructions whereby the substantial objects and purposes may be attained, I do not wish to be limited to the specific construction herein shown and described, except only as may be necessary by limitations in the hereunto appended claims.

I claim:—

1. An apparatus of the kind described comprising in combination with the frame of a self propelled vehicle, a rectangular plow spreader frame rigidly connected to and supported by said vehicle frame, a plow at the front end of said plow spreader, a front spreader wing operatively connected to the plow and extending forwardly and outwardly thereof, and means bracing said front spreader wing.

2. An apparatus of the kind described comprising in combination with the frame of a self propelled vehicle, a rectangular plow spreader frame rigidly connected to and supported by said vehicle frame, a plow at the front end of said spreader frame, capable of being vertically adjusted with respect to said spreader frame, a front spreader wing operatively connected to the plow and extending forwardly and outwardly thereof, and means bracing said front spreader wing.

3. An apparatus of the kind described comprising in combination with the frame of a self propelled vehicle, a rectangular plow spreader frame rigidly connected to and supported by said vehicle frame, a plow at the front end of said spreader frame and mounted for a vertical movement with respect thereto, means for imparting a vertical adjustable movement to said plow, a spreader wing operatively connected to said plow and extending forwardly and outwardly therefrom and means for bracing the outer end of said wing from said plow so that said wing will move vertically with said plow in the adjusting movement thereof.

4. An apparatus of the kind described comprising in combination with the frame of a self propelled vehicle including transversely extending front and rear end members, a plow spreader frame also including transverse front and rear end members, rigidly secured to the like members of the vehicle frame, said plow spreader frame also including angularly disposed members forward of said front end member, vertically disposed guides on said angularly disposed members, a plow having angularly disposed plate members, means connecting said plate members to the guide members and means for raising and lowering said plow.

5. An apparatus of the kind described comprising in combination with the frame of a self-propelled vehicle, a rectangular plow spreader frame rigidly connected to and supported by said vehicle frame, said plow spreader frame including angularly disposed parts at its front end, a vertically movable plow having side plates arranged parallel with said angularly disposed parts of said spreader frame, coacting means on said plow side plates and parts providing a guiding movement of said plow with respect to the spreader frame, and a brace bar connecting said plow side plates which brace bar rests upon said angularly disposed parts of the sperader frame when the plow is in its lowest working position.

6. An apparatus of the class described embodying therein a vehicle having a frame, a plow-spreader frame secured thereto, a plow supported at the forward end of the plow-spreader frame, and a toggle brace extending between plow and plow-spreader frame.

7. An apparatus of the class described embodying therein a vehicle having a frame, a plow-spreader frame secured thereto, a plow supported at the forward end of the plow-spreader frame, a toggle brace extending between plow and plow-spreader frame, and means for "breaking" the toggle brace.

8. An apparatus of the class described embodying therein a vehicle having a frame, a plow-spreader frame secured thereto, a vertically movable V-shaped plow arranged at the forward end thereof, and a brace extending between opposite sides of the V-shaped plow and being so positioned that it rests upon the plow-spreader frame when when the plow is in the lowest working position.

9. An apparatus of the class described embodying therein a vehicle having a frame, a plow, means separable from the vehicle frame for supporting the plow, and a toggle brace extending between the plow and its supporting means.

10. An apparatus of the class described embodying therein a vehicle having a frame, a plow, means separable from the vehicle frame for supporting the plow, a toggle brace extending between the plow and its supporting means, and means for "breaking" the toggle brace.

11. An apparatus of the class described embodying therein a vehicle having a frame, a V-shaped plow, means sparable from the vehicle frame for supporting the plow, and a supporting plate arranged at the bottom of the V-shaped plow.

In testimony whereof, I have hereunto set my hand this 9th day of April, 1926.

ALEXANDER L. GREENABAUM.